United States Patent
Naka et al.

(10) Patent No.: US 6,562,499 B1
(45) Date of Patent: May 13, 2003

(54) CATALYST AND METHOD FOR SELECTIVELY OXIDIZING CARBON MONOXIDE IN HYDROGEN-CONTAINING GAS AND SOLID POLYMER ELECTROLYTE-TYPE FUEL CELL SYSTEM USING SUCH CATALYST

(75) Inventors: Takahiro Naka, Wako (JP); Masako Takayama, Wako (JP); Osamu Usaka, Wako (JP); Shoji Isobe, Wako (JP); Takashi Ito, Ichikawa (JP); Katsumi Kurabayashi, Ichikawa (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 172 days.

(21) Appl. No.: 09/722,056

(22) Filed: Nov. 27, 2000

(30) Foreign Application Priority Data

Nov. 26, 1999 (JP) ............................. 11-336777

(51) Int. Cl.⁷ ..................... H01M 4/64; H01M 4/66; B01J 21/12
(52) U.S. Cl. ..................... 429/19; 429/40; 502/250; 252/463
(58) Field of Search ..................... 429/19, 40; 252/455, 252/463; 502/241, 250, 304

(56) References Cited

U.S. PATENT DOCUMENTS

| | | | | |
|---|---|---|---|---|
| 4,359,410 A | * | 11/1982 | Ueno | 252/463 |
| 4,378,307 A | * | 3/1983 | Brunelle | 252/455 |
| 5,015,614 A | * | 5/1991 | Baird, Jr. | 502/250 |
| 5,248,566 A | | 9/1993 | Kumar et al. | 429/19 |
| 5,268,346 A | * | 12/1993 | Ino | 502/304 |
| 5,702,838 A | * | 12/1997 | Yasumoto | 429/40 |

FOREIGN PATENT DOCUMENTS

| | | |
|---|---|---|
| JP | 8-295503 | 11/1996 |
| JP | 10-101302 | 4/1998 |

* cited by examiner

*Primary Examiner*—Patrick Ryan
*Assistant Examiner*—Mark Ruthkosky
(74) *Attorney, Agent, or Firm*—Arent Fox Kintner Plotkin & Kahn, PLLC

(57) ABSTRACT

A catalyst for selectively oxidizing carbon monoxide in a hydrogen-containing gas comprises an alumina hydrate carrier and at least platinum supported thereon. With an aluminum hydrate as a carrier, the catalyst is resistant to deactivation which would be caused by an oxygen-containing hydrocarbon in a hydrogen-rich gas. The method for selectively removing carbon monoxide comprises the steps of adding oxygen to a hydrogen-rich gas containing carbon monoxide, in an amount necessary to oxidize at least part of carbon monoxide, and bringing the resulting mixture into contact with the catalyst for selectively oxidizing carbon monoxide. The solid polymer electrolyte-type fuel cell system utilizes the above method for selectively removing carbon monoxide.

17 Claims, 1 Drawing Sheet ered gases obtained by reforming oxygen-containing hydrocarbons such as methanol or the like contain several percentages of impurities such as unreacted alcohols and intermediate products of alcohol decomposition, and these impurities (oxygen-containing hydrocarbons) significantly deactivate the catalyst used. Therefore, if a high removal ratio of carbon monoxide with conventional catalysts were sought, large volumes of catalysts would be required. Fuel cells for automobile need to be as small as possible because they are accommodated in a limited space of automobile; and the catalysts used in such fuel cells are desired to show a high removal ratio of carbon monoxide for a hydrogen-rich gas even when the hydrogen-rich gas contains oxygen-containing hydrocarbons.

The present invention has been completed to solve the above-mentioned problems of the prior art, aiming at providing a catalyst for oxidizing carbon monoxide in a hydrogen-rich gas at a high selectivity even when the hydrogen-rich gas contains oxygen-containing hydrocarbons; a method for removing carbon monoxide with such a catalyst; and a solid polymer electrolyte-type fuel cell system with such a catalyst.

CATALYST AND METHOD FOR SELECTIVELY OXIDIZING CARBON MONOXIDE IN HYDROGEN-CONTAINING GAS AND SOLID POLYMER ELECTROLYTE-TYPE FUEL CELL SYSTEM USING SUCH CATALYST

FIELD OF THE INVENTION

The present invention relates to a catalyst for selectively oxidizing carbon monoxide present in a fuel gas fed to an anode of a solid polymer electrolyte-type fuel cell, a method for selectively removing carbon monoxide with such a catalyst, and a solid polymer electrolyte-type fuel cell system with such a catalyst.

BACKGROUND OF THE INVENTION

Because a solid polymer electrolyte-type fuel cell is high in output power density, operable at low temperatures, emitting substantially no exhaust gas containing harmful substances, it is attracting much attention as a low-pollution power source not only for stationary applications but also for vehicle applications.

Generally used as a fuel gas for a fuel cell is a compressed hydrogen gas, a high-purity hydrogen gas fed from a liquid hydrogen tank, or a hydrogen-rich gas obtained by reforming various fuels (e.g. alcohols or hydrocarbons) by a reformer. When a hydrogen-rich gas is used in a low-temperature operation, for instance, at the start of an engine, however, it is known that impurities such as carbon monoxide, carbonized gas and the like present in the hydrogen-rich gas deactivate Pt contained in an anode catalyst, resulting in higher polarization and thus lower output.

In order to prevent such disadvantages, anodes are known which are obtained by alloying Pt with a noble metal such as Pd, Rh, Ir, Ru, Os, Au or the like, or with a base metal such as Sn, W, Cr, Mn, Fe, Co, Ni, Cu or the like. However, these anodes have a limitation in resistance to deactivation with CO, and are strikingly deactivated by a hydrogen-rich gas containing 100 ppm or more of carbon monoxide.

Hence, there were proposed catalysts capable of selectively removing only carbon monoxide from a hydrogen-rich gas without sacrificing hydrogen. As such catalysts for selectively oxidizing carbon monoxide, there are known catalysts obtained by supporting noble metals such as Pt or Ru on carriers such as alumina, titania, zirconia or the like. That is, oxygen is added to a hydrogen-rich gas by moles substantially equal to carbon monoxide contained in the hydrogen-rich gas, and the resultant mixed gas is contacted with the above catalyst to selectively remove carbon monoxide (U.S. Pat. No. 5,248,566, Japanese Patent Publication No. 39-21742, Japanese Patent Laid-Open No. 8-295503, and Japanese Patent Laid-Open No. 10-101302).

OBJECT OF THE INVENTION

Reformed gases obtained by reforming oxygen-containing hydrocarbons such as methanol or the like contain several percentages of impurities such as unreacted alcohols and intermediate products of alcohol decomposition, and these impurities (oxygen-containing hydrocarbons) significantly deactivate the catalyst used. Therefore, if a high removal ratio of carbon monoxide with conventional catalysts were sought, large volumes of catalysts would be required. Fuel cells for automobile need to be

DISCLOSURE OF THE INVENTION

As a result of intensive research to achieve the above aims, the inventors have found that with an alumina hydrate carrier supporting platinum, there can be obtained a catalyst for oxidizing carbon monoxide at a high selectivity in a hydrogen-containing gas. The present invention has been completed based on the above finding.

The present invention provides a catalyst having a high selective oxidation activity for carbon monoxide in a hydrogen-containing gas, which comprises an alumina hydrate carrier and at least platinum supported thereon.

The present invention also provides a structure comprising an integral support member coated with a catalyst for selectively oxidizing carbon monoxide, the catalyst comprising an alumina hydrate carrier and at least platinum supported thereon.

The present invention further provides a method for removing carbon monoxide from a hydrogen-rich gas containing carbon monoxide, which comprises the steps of adding oxygen to the hydrogen-rich gas containing carbon monoxide in an amount necessary to oxidize at least part of carbon monoxide, and contacting the resulting mixture with the above catalyst for selectively oxidizing carbon monoxide.

The present invention further provides a solid polymer electrolyte-type fuel cell system comprising at least a reactor containing a catalyst for selectively oxidizing carbon monoxide or a structure having the catalyst coated on an integral support member, the catalyst comprising an alumina hydrate carrier and at least platinum supported thereon. In a preferred embodiment, the solid polymer electrolyte-type fuel cell system comprises a fuel container, a reformer, a shifting reactor, a reactor for selectively oxidizing carbon monoxide with the above catalyst, and a solid polymer electrolyte-type fuel cell arranged in this order.

PREFERRED EMBODIMENTS OF THE INVENTION

Figure 1:
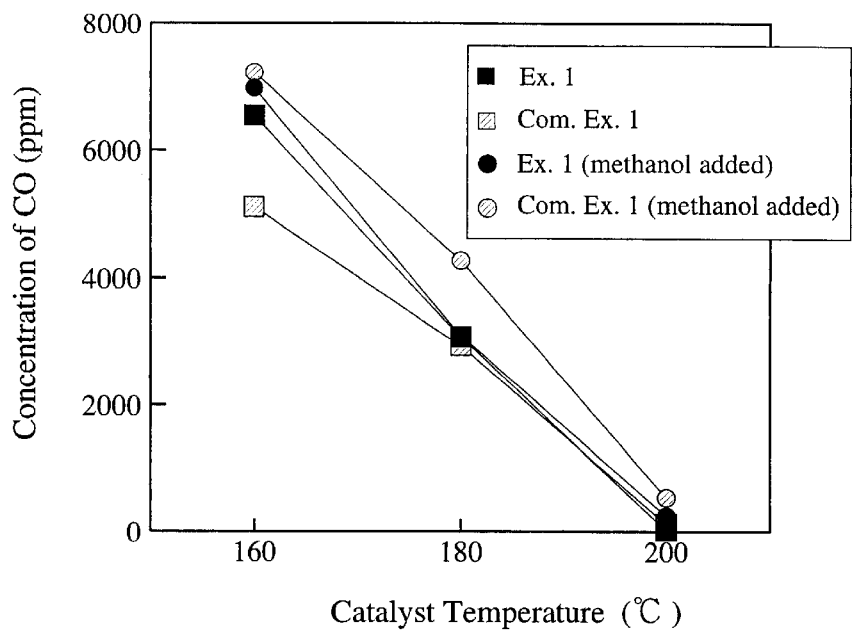
FIG. 1 is a graph showing relations between a catalyst temperature (° C.) and a concentration of CO (ppm) in an outlet gas.

Hereinafter, the present invention will be explained in detail.

[A] Catalyst for Selectively Oxidizing Carbon Monoxide

The catalyst of the present invention comprises platinum supported on an alumina hydrate carrier. The alumina hydrate used as a carrier for the catalyst is a compound obtained in the course of conversion of aluminum hydroxide into alumina by firing and dehydration, and is represented by a chemical formula of $Al_2O_3 \cdot nH_2O$ (n=1–3).

Compounds of the above chemical formula wherein n=3 may include, for example, bayerite, gibbsite and nordstrandite. Compounds of the chemical formula wherein n=2, there are no known compounds having a clear crystal forms, though there are gel-like compounds. Compounds of the chemical formula wherein n=1, there are, for example, diaspore and boehmite. Preferable among these compounds are boehmite, boehmite gel, pseudo-boehmite and mixtures of two or more of them.

Though the alumina hydrate carrier used in the present invention has no particular restriction as to the BET specific surface area, the specific surface area of the alumina hydrate carrier is preferably 150 $m^2/g$ or more, more preferably 200 $m^2/g$ or more, practically 200 to 400 $m^2/g$.

The aluminum hydroxide, a raw material for alumina hydrate, can be obtained by known methods such as neutralization of aluminum sulfate, hydrolysis of aluminum alkoxide and the like. Of these methods, preferred is the hydrolysis of aluminum alkoxide, which can produce an alumina hydrate containing no impurities and having a high BET specific surface area.

As mentioned above, the catalyst of the present invention comprises platinum supported on an alumina hydrate carrier. Though there is no particular restriction as to the state of Pt supported on an alumina hydrate carrier, Pt is preferably in a state of pure metal or in a low-valency state such as PtO, $PtO_2$ or the like. Two or more of these states may coexist. Of these states, a metal state is particularly preferred.

Though there is no particular restriction as to the amount of Pt supported, the amount of Pt is preferably 0.1 to 20% by weight, more preferably 0.5 to 10% by weight in terms of metal, relative to the mass of the catalyst.

There is no particular restriction as to the production method of the catalyst of the present invention. The catalyst of the present invention can be produced by usual methods such as impregnation, water absorption, evaporation and drying, and the like. The catalyst can be produced, for example, by adding a solution or suspension of a platinum compound (a starting material) to a carrier powder, drying the resulting mixture by evaporation, insolubilizing the carrier-supported component with an acid or an alkali, and then subjecting the resulting material to a reduction treatment for activation of the carrier-supported component.

The platinum compounds as starting materials may include, for example, platinic acid, platinum halides (e.g. platinum chloride, platinum bromide and platinum iodide), platinum sulfide, platinum selenide, platinum telluride, halogenated acids (e.g. chloroplatinic acid, bromoplatinic acid and iodoplatinic acid), alkali metal or ammonium salts of platinic acid, chloroplatinic acid or the like (e.g. sodium chloroplatinate and sodium platinate), platinum salts of inorganic acids, organoplatinum compounds (e.g. trichloroethyleneplatinate and platinum carbonyl compound), and platinum complexes.

After the above platinum compound is supported on a carrier powder, the insolubilization may be conducted by a usual method. When the platinum compound is an acidic platinum compound, a treatment with a base is conducted, and when the platinum compound is a basic platinum compound, a treatment with an acid is conducted. In any case, neutralization and precipitation may take place.

Usable for the reduction treatment for activating the insolubilized component supported on the carrier powder is a wet reduction method of treating the insolubilized component with a reducing agent such as formic acid, formalin, hydrazine or the like, or a gas-phase reduction method of treating the insolubilized component in a gas stream containing hydrogen.

In the wet reduction method, the treatment temperature is usually from room temperature to 100° C., and the treatment time is 24 hours or less. Preferably, the treatment temperature is 40 to 60° C., and the treatment time is 30 minutes to 4 hours.

In the gas-phase reduction method, there is no restriction as to the hydrogen content in the gas used, though it is preferred to use a gas containing hydrogen in an amount of 5 to 20% by volume with the balance being substantially nitrogen. The treatment temperature is usually from room temperature to 400° C., preferably 100 to 250° C. The treatment time is usually 10 minutes to 4 hours, preferably 30 minutes to 2 hours.

The catalyst after the reduction treatment may be used without further treatment, though it is preferably washed. Washing removes insoluble decomposition components formed from the platinum compound and decomposition components formed from the reducing agent.

In the process of producing the catalyst of the present invention, the temperatures are preferably 400° C. or lower in all treatment steps. A treatment temperature higher than 400° C. would undesirably convert the alumina hydrate as a carrier to a transition alumina such as γ-type, δ-type, η-type, θ-type, κ-type, χ-type or the like, and change the state of the catalyst metal.

How the catalyst of the present invention is used is not particularly restricted. For example, it is possible to mix a catalyst produced as above with a binder and forming the resulting mixture into a desired shape by compression, extrusion or the like. A carrier may be formed into a desired shape before a platinum compound is supported on the carrier. The carrier for the catalyst of the present invention is not restricted to a particular shape, and thus it may be in the shape of, for example, a sphere, a pellet, a cylinder, a honeycomb, a spiral, a granule and a ring. The shape, size, etc. of the carrier can be appropriately determined depending upon the use conditions of the catalyst.

It is also possible to apply the catalyst onto an integral support member to provide a catalyst-coated structure. The integral support members may be, for example, honeycomb-like or foamed ceramics (e.g. cordierite, mullite or ferrite) or metals (e.g. stainless steel).

The catalyst-coated structure may be produced by coating the catalyst of the present invention on the above-mentioned integral support member with or without an appropriate binder by a coating method such as wash coating or the like. Alternatively, the catalyst-coated structure may be produced by coating only a carrier on an integral support member and then applying a platinum compound onto the integral support member.

The binder may be a usual binder such as alumina sol, silica sol, aluminum nitrate, aluminum nitrate or the like.

[B] Method for Selectively Removing Carbon Monoxide

Explanation will be made with respect to the method for selectively removing carbon monoxide according to the present invention. In the method, oxygen is added to a hydrogen-rich gas containing carbon monoxide, in an amount necessary to oxidize at least part of CO contained in the above gas, and the resulting mixture is contacted with the catalyst of the present invention to selectively oxidize and remove only CO with substantially no sacrifice of hydrogen. The method is applied to, for example, a gas fed from the shifting reactor of a solid polymer electrolyte-type fuel cell system described later.

The oxygen is added usually in the form of air. High-concentration oxygen is advantageous for the oxidation of CO, though excessive oxygen oxidizes hydrogen, too. To achieve a high removal ratio (%) of CO without reducing the recovery ratio (%) of hydrogen, the molar ratio of oxygen to CO is preferably 0.5 to 2.5, more preferably 0.7 to 1.5.

The temperature at which the gas is brought into contact with the catalyst is preferably 60 to 220° C., more preferably 100 to 170° C. The space velocity of the gas (GHSV) is usually 5,000 to 150,000/hr, preferably 10,000 to 100,000/hr.

By the removal method of the present invention, the CO concentration in the gas can be reduced to 100 ppm or less, if necessary to 50 ppm or less, further even to 30 ppm or less, with a recovery ratio of hydrogen as high as 98% or more.

A higher removal ratio (%) of CO can be achieved in the method of the present invention than in conventional methods, even when the gas to be treated contains several percentages of unreformed components such as hydrocarbons (e.g. methane), oxygen-containing hydrocarbons (e.g. methanol) and the like together with 20 to 30% of $H_2O$, $CO_2$ and $N_2$.

[C] Solid Polymer Electrolyte-type Fuel Cell System

The solid polymer electrolyte-type fuel cell system of the present invention comprises at least a reactor for selectively oxidizing carbon monoxide using the catalyst of the present invention. In a preferred embodiment, the solid polymer electrolyte-type fuel cell system of the present invention is constituted by:

(i) A container for a fuel comprising a hydrocarbon and/or an oxygen-containing hydrocarbon;

(ii) A reformer to which the above fuel, water and, if necessary, air are fed to be brought into contact with a reforming catalyst to generate $H_2$, CO and $CO_2$;

(iii) A shifting reactor in which the reformed gas formed in the reformer is mixed with steam, and the resultant mixture is brought into contact with a catalyst to reduce the CO concentration in the mixture to 2% by volume or less;

(iv) A reactor in which the gas formed in the shifting reactor is mixed with a predetermined amount of air, and the resultant mixture is contacted with the catalyst of the present invention to selectively oxidize carbon monoxide, thereby reducing the CO concentration in the mixture to 100 ppm or less; and (v) A solid polymer electrolyte-type fuel cell.

Some of the above constituents may be combined together, or other constituents may be added to the system of the present invention. For example, when methanol is used as a fuel, the shifting reactor may be incorporated into the reformer as one unit. Because 10 to 20% of $H_2$ remains unutilized in the exhaust gas from the anode of the solid polymer electrolyte-type fuel cell, it is possible to add a catalytic burner to the system of the present invention, so that the anode exhaust gas and air are introduced to the catalytic burner to burn the residual hydrogen and utilize the resulting combustion heat, for example, for the vaporization of methanol used as a fuel.

In the solid polymer electrolyte-type fuel cell system of the present invention, the reactor for selectively oxidizing carbon monoxide uses the catalyst of the present invention excellent in selectivity of oxidation for CO, and thus the catalyst and the reactor can be made small, feeding a low-CO-concentration, hydrogen-rich gas to the fuel cell downstream thereof. As a result, the deactivation of the anode catalyst can be suppressed, thereby extending the life of the anode catalyst.

The present invention will be explained in further detail by the following EXAMPLES without intention of restricting the scope of the present invention defined by the claims attached hereto.

EXAMPLE 1

Into a separable flask equipped with a reflux condenser were fed 500 g of aluminum isopropoxide (special-grade chemical available from Wako Pure Chemical Industries, Ltd.) and 3 kg of pure water. The content in the flask was stirred at 80° C. for 24 hours to completely hydrolyze the aluminum isopropoxide to precipitate aluminum hydroxide. The aluminum hydroxide precipitate was washed with a large amount of pure water and then subjected to a heat treatment in an oven at 400° C. for 1 hour to obtain a carrier (boehmite) for catalyst production.

Into a separable flask were fed 0.29 g of chloroplatinic acid (special-grade chemical available from Wako Pure Chemical Industries, Ltd.), 24.9 g of the above-obtained boehmite and 100 ml of water. Further added thereto was an appropriate amount of an aqueous potassium hydroxide solution for pH adjustment to 10, to obtain a platinum slurry.

Separately, 0.18 g of sodium boron hydroxide was dissolved in 13.8 g of water to prepare a reducing solution. While the platinum slurry was kept at 50° C., the reducing solution was dropped into the platinum slurry over 4 minutes to conduct a reduction treatment. The resulting solid was collected by filtration, washed with water, dried at 120° C. for 2 hours to obtain 25 g of a catalyst powder having 0.46% Pt supported on a boehmite carrier powder. The resulting catalyst powder was compressed by an 8-ton press and ground. The resulting material was sifted to obtain particles of 80 to 100 mesh as a catalyst sample.

COMPARATIVE EXAMPLE 1

Into a separable flask were fed 0.29 g of chloroplatinic acid (special-grade chemical available from Wako Pure Chemical Industries, Ltd.), 24.9 g of γ-alumina (TA-2301 available from Sumitomo Chemical Co., Ltd.) and 100 ml of water. Added thereto was an appropriate amount of an aqueous potassium hydroxide solution for pH adjustment to 10, to obtain a platinum slurry. Separately, 0.18 g of sodium boron hydroxide was dissolved in 13.8 g of water to prepare a reducing solution. While the platinum slurry was kept at 50° C., the reducing solution was dropped into the platinum slurry over 4 minutes to conduct a reduction treatment. The resulting solid was collected by filtration, washed with water, dried at 120° C. for 2 hours to obtain 25 g of a catalyst powder having 0.46% Pt supported on an alumina carrier powder.

The catalyst powder was compressed by an 8-ton press and ground. The resulting material was sifted to obtain particles of 80 to 100 mesh as a catalyst sample.

Evaluation of Performance

The catalyst samples in EXAMPLE 1 and COMPARATIVE EXAMPLE 1 were evaluated with respect to the selective oxidation activity for CO in a hydrogen-containing gas by the following method.

Figure 2:
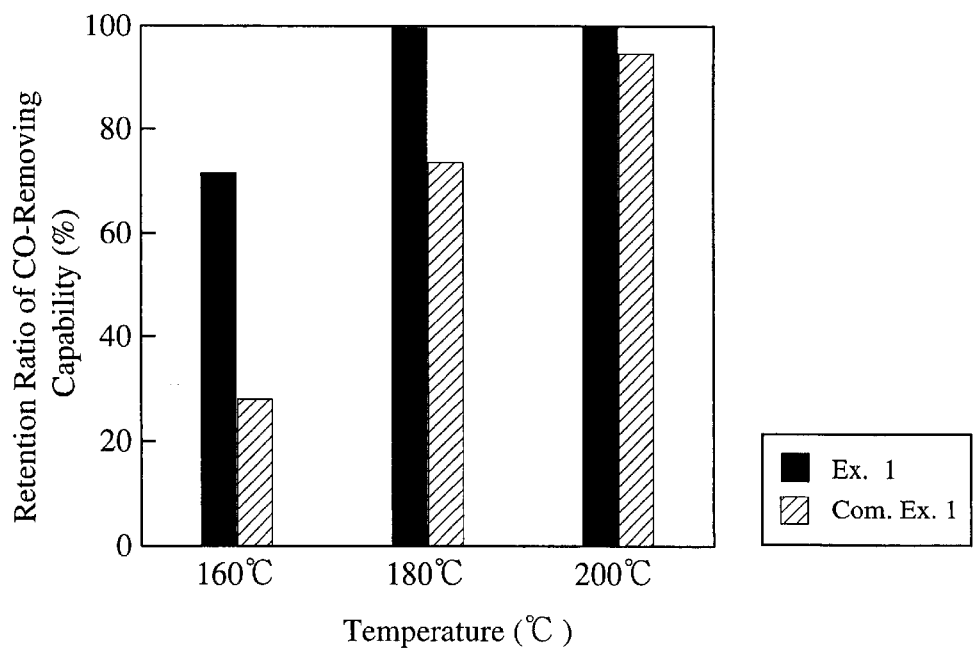
FIG. 2 is a graph showing a retention ratio (%) of CO-removing capability when methanol was added to a hydrogen-rich gas.

0.5 cc of each catalyst sample was set in a quartz reaction tube having an inner diameter of 8 mm. One of the following gases of different compositions was caused to pass through the tube at a rate of 20 liters per hour while being preheated at 160° C., 180° C. and 200° C., respectively. The reacted gas was analyzed by gas chromatography. The CO concentrations measured in outlet gases are shown in FIG. 1, and the removal ratios (%) of CO are shown in Table 1. The retention ratios (%) of CO-removing capability in the case of methanol added are shown in FIG. 2.

| Hydrogen-Rich Gas A | |
| --- | --- |
| Hydrogen | 43.7%, |
| CO | 8,050 ppm, |
| $CO_2$ | 18.4%, |
| $O_2$ | 1.23%, |
| $H_2O$ | 22%, and |
| Nitrogen | Balance. |

| Hydrogen-Rich Gas B (Methanol Added) | |
| --- | --- |
| Hydrogen | 43.7%, |
| CO | 8,050 ppm, |
| $CO_2$ | 18.4%, |
| $O_2$ | 1.23%, |
| $H_2O$ | 21%, |
| Methanol | 1%, and |
| Nitrogen | Balance. |

TABLE 1

Removal Ratio of CO

| | EXAMPLE 1 | | COMPARATIVE EXAMPLE 1 | |
| --- | --- | --- | --- | --- |
| Temp. | Gas A | Gas B | Gas A | Gas B |
| 160° C. | 18.6% | 13.3% | 36.4% | 10.2% |
| 180° C. | 61.7% | 61.5% | 63.5% | 46.8% |
| 200° C. | 97.3% | 96.9% | 98.5% | 93.3% |

As is clear from Table 2, in COMPARATIVE EXAMPLE 1 using a γ-alumina carrier, the removal ratio (%) of CO was strikingly low for the methanol-containing gas (hydrogen-rich gas B). In contrast, in EXAMPLE 1 using a boehmite carrier, the retention ratio (%) of CO-removing capability was excellent.

The catalyst of the present invention comprising platinum supported on an alumina hydrate carrier shows an excellent selectivity of oxidation of carbon monoxide present in a hydrogen-containing gas. The catalyst of the present invention also shows an excellent selectivity of oxidation in the removal of CO from a hydrogen-rich gas containing a oxygen-containing hydrocarbon obtained by alcohol reforming or the like. With the catalyst of the present invention, the system for removing CO from the hydrogen-rich gas obtained by alcohol reforming can be made small in size.

What is claimed is:

1. A catalyst for selectively oxidizing carbon monoxide in a hydrogen-rich gas, which comprises an alumina hydrate carrier and at least platinum supported thereon.

2. The catalyst for selectively oxidizing carbon monoxide according to claim 1, wherein said alumina hydrate is at least one selected from the group consisting of boehmite, a pseudo-boehmite and a boehmite gel.

3. A structure comprising an integral support member coated with a catalyst for selectively oxidizing carbon monoxide in a hydrogen-rich gas, said catalyst comprising an alumina hydrate carrier and at least platinum supported thereon.

4. The structure according to claim 3, wherein said alumina hydrate is at least one selected from the group consisting of boehmite, a pseudo-boehmite and a boehmite gel.

5. A method for removing carbon monoxide from a hydrogen-rich gas, comprising the steps of (a) adding oxygen to said hydrogen-rich gas containing carbon monoxide, in an amount necessary to oxidize at least part of carbon monoxide, and (b) bringing the resulting mixture into contact at a temperature ranging from 60° C. to 220° C. with a catalyst for selectively oxidizing carbon monoxide or with a structure having said catalyst coated on an integral support member, said catalyst comprising an alumina hydrate carrier and at least platinum supported thereon.

6. The method according to claim 5, wherein said alumina hydrate is at least one selected from the group consisting of boehmite, a pseudo-boehmite and a boehmite gel.

7. A solid polymer electrolyte-type fuel cell system comprising at least a reactor for selectively oxidizing carbon monoxide in a hydrogen-rich gas at a temperature ranging from 60° C. to 220° C., said reactor containing a catalyst for selectively oxidizing carbon monoxide or a structure having said catalyst coated on an integral support member, said catalyst comprising an alumina hydrate carrier and at least platinum supported thereon.

8. The solid polymer electrolyte-type fuel cell system according to claim 7, wherein said alumina hydrate is at least one selected from the group consisting of boehmite, a pseudo-boehmite and a boehmite gel.

9. The structure according to claim 3, wherein said catalyst comprising a boehmite carrier and platinum supported thereon forms a catalyst-coated structure, which is produced by coating said catalyst onto an integral support member comprising a honeycomb-like or foamed ceramic or metal.

10. The method according to claim 5, wherein said resulting gas mixture is brought into contact with said catalyst at a space velocity (GHSV) of 5,000 to 150,000/hr.

11. The method according to claim 5, wherein the molar ratio of said oxygen to said carbon monoxide is 0.5 to 2.5.

12. The method according to claim 5, wherein said hydrogen-rich gas contains an oxygen-containing hydrocarbon.

13. The solid polymer electrolyte-type fuel cell system according to claim 7, wherein said selective oxidation of carbon monoxide in said hydrogen-rich gas is carried out in the presence of said catalyst at a space velocity (GHSV) of 5,000 to 150,000/hr.

14. The solid polymer electrolyte-type fuel cell system according to claim 7, wherein the molar ratio of said oxygen to said carbon monoxide in oxidizing carbon monoxide in said hydrogen-rich gas is 0.5 to 2.5.

15. The solid polymer electrolyte-type fuel cell system according to claim 7, wherein said hydrogen-rich gas contains an oxygen-containing hydrocarbon.

16. A catalyst comprising an alumina hydrate carrier and at least platinum supported thereon, wherein the catalyst is suitable for selectively oxidizing carbon monoxide in a hydrogen-rich gas.

17. The catalyst of claim 16, wherein said alumina hydrate is at least one selected from the group consisting of boehmite, a pseudo-boehmite and a boehmite gel.

* * * * *